(12) United States Patent
Park et al.

(10) Patent No.: US 9,300,947 B2
(45) Date of Patent: Mar. 29, 2016

(54) PRODUCING 3D IMAGES FROM CAPTURED 2D VIDEO

(75) Inventors: Minwoo Park, Pittsford, NY (US); Jiebo Luo, Pittsford, NY (US); Andrew Charles Gallagher, Fairport, NY (US)

(73) Assignee: Kodak Alaris Inc., Rochester, NY (US)

( * ) Notice: Subject to any disclaimer, the term of this patent is extended or adjusted under 35 U.S.C. 154(b) by 730 days.

(21) Appl. No.: 13/070,670

(22) Filed: Mar. 24, 2011

(65) Prior Publication Data

US 2012/0242794 A1 Sep. 27, 2012

(51) Int. Cl.
*H04N 13/02* (2006.01)
*G06T 7/00* (2006.01)
*G06K 9/32* (2006.01)

(52) U.S. Cl.
CPC .............. *H04N 13/0264* (2013.01); *G06K 9/32* (2013.01); *G06T 7/0075* (2013.01); *H04N 13/0221* (2013.01)

(58) Field of Classification Search
CPC ..... H04N 13/0264; G06K 9/32; G06T 7/0071
USPC ............................................ 348/46; 382/154
See application file for complete search history.

(56) References Cited

U.S. PATENT DOCUMENTS

| | | | |
|---|---|---|---|
| 5,847,710 A * | 12/1998 | Kroitor | 345/421 |
| 6,038,074 A * | 3/2000 | Kitaguchi | G01C 11/06 128/916 |
| 6,362,817 B1 * | 3/2002 | Powers et al. | 345/419 |
| 6,487,304 B1 * | 11/2002 | Szeliski | 382/107 |
| 6,711,293 B1 | 3/2004 | Lowe | |
| 6,847,733 B2 | 1/2005 | Savakis | |
| 7,027,054 B1 * | 4/2006 | Cheiky et al. | 345/473 |
| 7,102,686 B1 | 9/2006 | Orimoto et al. | |
| 7,161,614 B1 * | 1/2007 | Yamashita | H04N 13/026 348/42 |
| 7,194,126 B2 * | 3/2007 | Konolige | 382/154 |
| 7,457,433 B2 * | 11/2008 | Hampapur et al. | 382/103 |
| 7,643,657 B2 | 1/2010 | Dufaux et al. | |
| 7,778,469 B2 | 8/2010 | Cooper et al. | |
| 8,175,412 B2 * | 5/2012 | Basri | G06K 9/34 382/100 |

(Continued)

OTHER PUBLICATIONS

Guttmann et al., "Semi-automatic stereo extraction from video footage," Proc. IEEE International Conference Computer Vision, pp. 136-142 (2009).

(Continued)

*Primary Examiner* — William C Vaughn, Jr.
*Assistant Examiner* — Luis Perez Fuentes
(74) *Attorney, Agent, or Firm* — Hogan Lovells US LLP

(57) ABSTRACT

A method of producing a stereo image from a temporal sequence of digital images, comprising: receiving a temporal sequence of digital images; analyzing pairs of digital images to produce corresponding stereo suitability scores, wherein the stereo suitability score for a particular pair of images is determined responsive to the relative positions of corresponding features in the particular pair of digital image; selecting a pair of digital images including a first image and a second image based on the stereo suitability scores; using a processor to analyze the selected pair of digital images to produce a motion consistency map indicating regions of consistent motion, the motion consistency map having an array of pixels; producing a stereo image pair including a left view image and a right view image by combining the first image and the second image responsive to the motion consistency map; and storing the stereo image pair in a processor-accessible memory.

19 Claims, 7 Drawing Sheets

(56) References Cited

U.S. PATENT DOCUMENTS

| | | | | |
|---|---|---|---|---|
| 8,208,716 | B2* | 6/2012 | Choi | G06T 7/0075 |
| | | | | 382/106 |
| 8,289,380 | B2* | 10/2012 | Kim | G02B 27/26 |
| | | | | 348/42 |
| 8,345,956 | B2* | 1/2013 | Ward | G06T 7/0071 |
| | | | | 382/103 |
| 8,401,241 | B2* | 3/2013 | Chandraker | G06K 9/32 |
| | | | | 345/419 |
| 8,508,580 | B2* | 8/2013 | McNamer et al. | 348/43 |
| 8,629,899 | B2* | 1/2014 | Raveendran et al. | 348/43 |
| 2004/0240725 | A1* | 12/2004 | Xu | G06K 9/32 |
| | | | | 382/154 |
| 2008/0218611 | A1 | 9/2008 | Parulski et al. | |

OTHER PUBLICATIONS

Hoiem et al, "Automatic Photo Pop-up," ACM Transactions on Graphics, vol. 24, pp. 577-584 (2005).

Saxena et al., "Make3d: Learning 3D scene structure from a single still image," IEEE Trans. Pattern Analysis and Machine Intelligence, vol. 31, pp. 824-840 (2009).

Ideses et al., "Real-time 2D to 3D video conversion," Journal of Real-Time Image Processing, vol. 2, pp. 3-9 (2007).

Shi et al., "Good features to track," Proc. IEEE Conference on Computer Vision and Pattern Recognition, pp. 593-600 (1994).

Lucas et al., "An iterative image registration technique with an application to stereo vision," Proc. Imaging Understanding Workshop, pp. 121-130 (1981).

Sivic et al. in the article "Video Google: a text retrieval approach to object matching in videos," Proc. IEEE International Conference on Computer Vision: pp. 1470-1477 (2003).

Hartley, et al. "Multiple view geometry in computer vision," Cambridge University Press, Second Edition (2004).

Ratakonda, "Real-Time Digital Video Stabilization for Multi-Media Applications," Proc. IEEE International Conference on Computer and Systems, vol. 4, pp. 69-72 (1998).

Shotton et al., "TextonBoost: joint appearance, shape and context modeling for multi-class object recognition and segmentation," Proc. European Conference on Computer Vision, pp. 1-15 (2006).

Snavely et al., "Photo tourism: exploring photo collections in 3D," ACM Transactions on Graphics, pp. 835-846 (2006).

Vidal et al., "Two-View Multibody Structure from Motion", International Journal of Computer Vision, vol. 68, pp. 7-25 (2006).

Felzenszwalb et al., "Efficient graph-based image segmentation" International Journal of Computer Vision, vol. 59, pp. 167-181 (2004).

Komodakis et al., "Approximate labeling via graph cuts based on linear programming," IEEE Transactions on Pattern Analysis and Machine Intelligence, vol. 29, pp. 1436-1453 (2007).

Mičušík et al., "Multi-view superpixel stereo in urban environments," International Journal of Computer Vision, vol. 89, pp. 106-119 (2010).

U.S. Appl. No. 12/705,652, filed Feb. 15, 2010, Gallagher, et al.

* cited by examiner

PRODUCING 3D IMAGES FROM CAPTURED 2D VIDEO

FIELD OF THE INVENTION

The present invention relates to digital image and video processing, and particularly to a method for determining a set of one or more stereo images from a captured 2D video and converting a determined set of one or more stereo images to produce correct 3D perception.

BACKGROUND OF THE INVENTION

Stereo and multi-view imaging has a long and rich history stretching back to the early days of photography. Stereo cameras employ multiple lenses to capture two images, typically from points of view that are horizontally displaced, to represent the scene from two different points of view. Such image pairs are displayed to the left and right eyes of a human viewer to let the viewer experience an impression of three dimensions (3D). The human visual system then merges information from the pair of different images to achieve the perception of depth.

Stereo cameras can come in any number of configurations. For example, a lens and a sensor unit can be attached to a port on a traditional single-view digital camera to enable the camera to capture two images from slightly different points of view, as described in U.S. Pat. No. 7,102,686 to Orimoto et al., entitled "Image-capturing apparatus having multiple image capturing units." In this configuration, the lenses and sensors of each unit are similar and enable the interchangeability of parts. U.S. Patent Application Publication 2008/0218611 to Parulski et al., entitled "Method and apparatus for operating a dual lens camera to augment an image," discloses another camera configuration having two lenses and image sensors that can be used to produce stereo images.

In another line of teaching, there are situations where a stereo image (or video) is desired, but only a single-view image (or video) has been captured. The problem of forming a stereo image from conventional two-dimensional (2D) images, is known as 2D-to-3D conversion, and has been addressed in the art. For example, Guttmann et al. in the article "Semi-automatic stereo extraction from video footage" (Proc. IEEE International Conference Computer Vision, pp. 136-142, 2009), teach a semi-automatic approach (using user input with scribbles) for converting each image of the video to stereo.

Hoiem et al, in the article "Automatic Photo Pop-up," (ACM Transactions on Graphics, Vol. 24, pp. 577-584, 2005) describe a method for estimating the 3D geometry from a 2D image and producing images that represent what the scene might look like from another viewpoint.

Saxena et al., in the article "Make3d: Learning 3D scene structure from a single still image" (IEEE Trans. Pattern Analysis and Machine Intelligence, Vol. 31, pp. 824-840, 2009), describe a method for estimating 3D structure from a single still image in an unconstrained environment. The method uses a Markov Random Field trained via supervised learning to model both image depth cues and the relationships between different parts of the image.

Ideses et al., in the article "Real-time 2D to 3D video conversion" (Journal of Real-Time Image Processing, Vol. 2, pp. 3-9, 2007) describe a method to extract stereo pairs from video sequences. The method makes use of MPEG motion estimation that can be obtained in the decoding stage of a video. The magnitude of the optical flow between consecutive image frames associated with MPEG motion estimation is used as a depth map, as if a parallel camera acquired the images. Next, a second view for a stereo pair is resampled from the current frame using the depth map; the pixel values of the next frame are not used to generate the second view. With this approach, abrupt rotations and small transitions of a camera, which are frequently present in general 2D videos, violate the assumption of a parallel camera and can produce undesirable results.

In another line of teaching, U.S. Pat. No. 7,643,657, to Dufaux et al., entitled "System for selecting a keyframe to represent a video," teaches a method to selecting key frames in a video sequence based on finding shot boundaries and considering other features such as spatial activity and skin detection. However, key frame extraction does not provide a method for representing for forming a stereo image from a video sequence.

SUMMARY OF THE INVENTION

In accordance with the present invention, there is provided a method of producing a stereo image from a temporal sequence of digital images, comprising:

receiving a temporal sequence of digital images captured by an image capture device;

using a processor to analyze pairs of digital images from the temporal sequence of digital images to produce corresponding stereo suitability scores, wherein the stereo suitability score for a particular pair of images is determined responsive to the relative positions of corresponding features in the particular pair of digital images;

selecting a pair of digital images including a first image and a second image based on the stereo suitability scores;

using a processor to analyze the selected pair of digital images to produce a motion consistency map indicating regions of consistent motion, the motion consistency map having an array of pixels;

producing a stereo image pair including a left view image and a right view image by combining the first image and the second image responsive to the motion consistency map; and storing the stereo image pair in a processor-accessible memory.

This invention has the advantage that it produces one or more stereo images from a digital video that is captured using a conventional 2D image capture device such as a video camera. The method can be used to produce left and right views for the stereo images that correctly convey an impression of the depth for the scene.

It has the further advantage that stereo images can be formed from digital videos captured under a variety of conditions such as videos of a stationary scene captured with a horizontally moving video camera, or videos of a scene containing one or more rigid or non-rigid moving objects captured using a stationary video camera.

It is to be understood that the attached drawings are for purposes of illustrating the concepts of the invention and may not be true to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
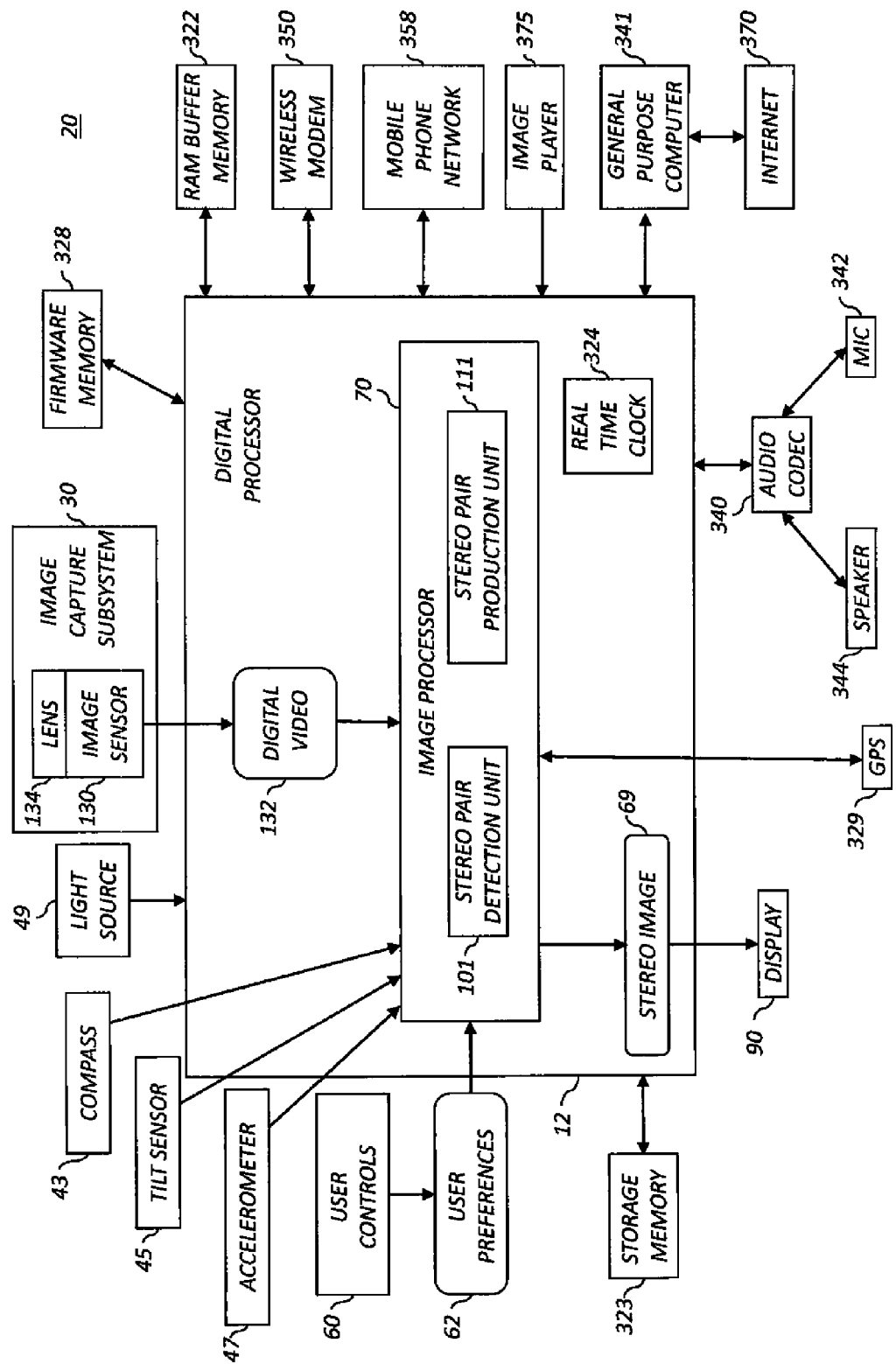
FIG. 1 is a block diagram of a digital imaging system that can be used to practice the present invention.

FIG. 1 is a block diagram of a digital imaging system 20 including an image capture subsystem 30 and an associated digital processor 12 that can be used to implement the present invention according to a preferred embodiment. The present invention can also be implemented for use with any type of digital imaging device, such as a digital still camera, a digital video camera, a camera phone, personal computer, or any other digital imaging system that can capture or process temporal sequences of digital images.

While the present invention will be described with reference to a digital video sequence, it will be understood that it can also be applied to any type of temporal sequence of digital images. For example, it can be applied to a set of digital images captured using a digital camera operating in a "burst capture mode." Burst capture modes are well-known in the art, and are used to capture a sequence of images at a relatively high frame rate (e.g., 10 frames/sec). Typically the frame rate used for in a burst capture mode is slower than the frame rate used to capture a video sequence (e.g., 30 frames/second). In some embodiments, the present invention can also be applied to a temporal sequence of digital images captured by a user repeatedly activating the image capture button on a digital camera to capture a set of images at different times. In other embodiments, the present invention can be applied to a temporal sequence of digital images corresponding to a time lapse photography sequence where images are periodically captured of a scene to show the gradual change or movement of objects in the scene.

The image capture subsystem 30 includes an image sensor 130 and lens 134, for capturing a digital video 132. The digital video 132 includes a plurality of digital images corresponding to a temporal sequence of image frames. The image sensor 130 includes an array of photosensitive pixels, and can be of any appropriate resolution (e.g., 1280 columns×960 rows of pixels). The digital video 132 can also include an associated audio signal.

The digital imaging system 20 of FIG. 1 also includes an optional display 90 for viewing digital images. The display 90 can use any display technology known in the art, including LCD, CRT, OLED, plasma, or projection displays. The display 90 preferably contains a touch-screen interface that permits a user to control the device, for example, by touching various user control elements. When advisable, a light source 49, such as a flash, can be activated to provide improved photographic quality in low light conditions.

The digital data for the digital video 132 is stored in a RAM buffer memory 322 and subsequently processed by a digital processor 12 controlled by firmware stored in a firmware memory 328, which can be, for example, flash EPROM memory. The digital processor 12 includes a real-time clock 324, which keeps the date and time even when the system and digital processor 12 are in their low power state. The digital video 132 will typically be compressed with H.264 and encoded as MPEG4 for storage in a storage memory 323. The storage memory 323 can be any processor-accessible data storage device, whether volatile or non-volatile, electronic, magnetic, optical, or otherwise, including but not limited to, registers, floppy disks, hard disks, Compact Discs, DVDs, flash memories, ROMs, and RAMs.

In some embodiments, the geographic location is stored as metadata together with the digital video 132. The geographical location can be determined by using, for example, a GPS unit 329. Other methods for determining location can use any of a number of methods for determining the location of the digital imaging system 20 at the time that the digital video 132 is captured. For example, the geographic location can be determined from the location of nearby cell phone towers. The location is preferably stored in units of latitude and longitude. Geographic location from the GPS unit 329 is used in some embodiments to specify regional preferences or behaviors of the digital imaging system 20.

The graphical user interface displayed on the display 90 is controlled by user controls 60. The user controls 60 can include dedicated push buttons (e.g. a telephone keypad) to dial a phone number; a control to set the mode, a joystick controller that includes 4-way control (up, down, left, and right) and a push-button center "OK" switch, or the like. The user controls 60 are used by a user to indicate user preferences 62 or to select various modes of operation or settings for the digital imaging system 20.

It should also be noted that the present invention is implemented in a combination of software and hardware and is not limited to devices that are physically connected or located within the same physical location. The digital processor 12 is coupled to a wireless modem 350, which enables the display system to transmit and receive information via an RF channel. The wireless modem 350 communicates over a radio frequency (e.g., wireless) link with an external system such as a mobile phone network 358 (e.g., a 3GSM network). The mobile phone network 358 can communicate with a network server, which can provide and receive various data in accordance with the present invention. The mobile phone network 358 can also connect to a standard telephone network (not shown) in order to provide normal telephone service.

The digital imaging system 20 can, in some embodiments, access a wireless modem 350, the internet 370 or an image player 375 (e.g., a DVD player) to receive sequences of digital images for processing according the method of the present invention. In some embodiments, the internet 370 can be accessed through a general purpose computer 341. In some embodiments, the interface between the digital imaging system 20 and the general purpose computer 341 can be a wireless interface, such as the well-known Bluetooth wireless interface or the well-known 802.11b wireless interface.

In some embodiments, the digital imaging system 20 accesses a mobile phone network 358 for permitting human communication via the digital imaging system 20, or for permitting signals to travel to or from the digital imaging system 20. An audio codec 340 connected to the digital processor 12 receives an audio signal from a microphone 342 and provides an audio signal to a speaker 344. These components are used both for telephone conversations and to record and playback an audio track associated with the digital video 132. The speaker 344 can also be used to inform the user of an incoming phone call. This is done using a standard ring tone stored in firmware memory 328, or by using a custom ringtone downloaded from the mobile phone network 358 and stored in the RAM buffer memory 322. In addition, a vibration device (not shown) can optionally be used to provide a quiet (e.g. non audible) notification of an incoming phone call.

Referring again to FIG. 1, the digital processor 12 accesses a set of sensors including a compass 43 (preferably a digital compass), a tilt sensor 45, the GPS unit 329, and an accelerometer 47. Preferably, the accelerometer 47 detects both linear and rotational accelerations for each of three orthogonal directions (for a total of 6 dimensions of input). In some embodiments, the acceleration information can be used to improve the quality of the digital videos by applying various image processing operations (e.g., deconvolution can be applied to correct for blur in the digital images). In some embodiments, the acceleration information is stored as metadata in association with the digital video 132. In the preferred embodiment, all of these sensing devices are present, but in some embodiments, one or more of the sensors may be absent.

According to a preferred embodiment, an image processor 70 is used to process the digital video 132 to provide a stereo image 69. The image processor 70 includes a stereo pair detection unit 101 and a stereo pair production unit 111, which are used to produce the stereo image 69, responsive to various user preferences 62. In some embodiments, the resulting stereo image 69 is displayed on display 90. Further, the image processor 70 can also perform other image processing operations to improve the quality of the digital video 132 (e.g., by removing the hand tremor from the digital video 132).

In some embodiments, the display 90 can be a standard LCD or OLED display as is well known in the art, or it can be a stereo display such as described in U.S. patent application Ser. No. 12/705,652 to Gallagher et al., filed Feb. 15, 2010, entitled "3-Dimensional display with preferences." Preferably the display 90 is used to display the stereo image 69 that is derived from the digital video 132. Some displays 90 that display stereo images require that the viewer wear special eyeware such as shutter glasses. Other displays 90 are capable of providing a viewer with a unique image for each eye to convey the impression of depth using, for example, barriers or lenticular surfaces (autostereoscopic displays). Even with a standard 2D display 90, stereo images can be effectively shown to a viewer using the well-known anaglyph method, where the viewer wears anaglyph glasses with one red lens and another blue lens to view an anaglyph image produced using the red channel of the left viewpoint image and the blue (and sometimes green) channels of the right viewpoint image.

The present invention is directed towards producing a set of one or more stereo images 69 from a captured digital video 132. As used herein, a stereo image 69 is a set of images of substantially the same scene having the appearance of being captured from different viewpoints. A stereo image can be produced by literally photographing a scene from two different camera positions, or by other methods (e.g., by fixing the position of a camera, and then capturing images of a scene including moving objects.) Typically, a stereo image includes a left image and a right image, corresponding to images to be viewed with the left and right eyes of an observer, respectively.

The present invention is directed at identifying pairs of image frames in the digital video 132 for which good quality stereo images 69 can be produced. In some cases, the identified pairs of image frames can be used directly as the left and right images of the stereo image 69. In other cases, additional processing may be required to produce a good quality stereo image 69 because of inconsistencies in the motion of objects in the scene. The resulting stereo image 69 can allow the viewer to experience a 3D perception of the scene even though it originated from a conventional 2D digital video 132. The 3D perception of the scene may or may not correspond to a realistic 3D view of the original scene depending on the motion characteristics of the objects in the digital video 132. However, even when the 3D perception of the scene is not an accurate representation of the scene, it can still have value for entertainment purposes.

Figure 2:
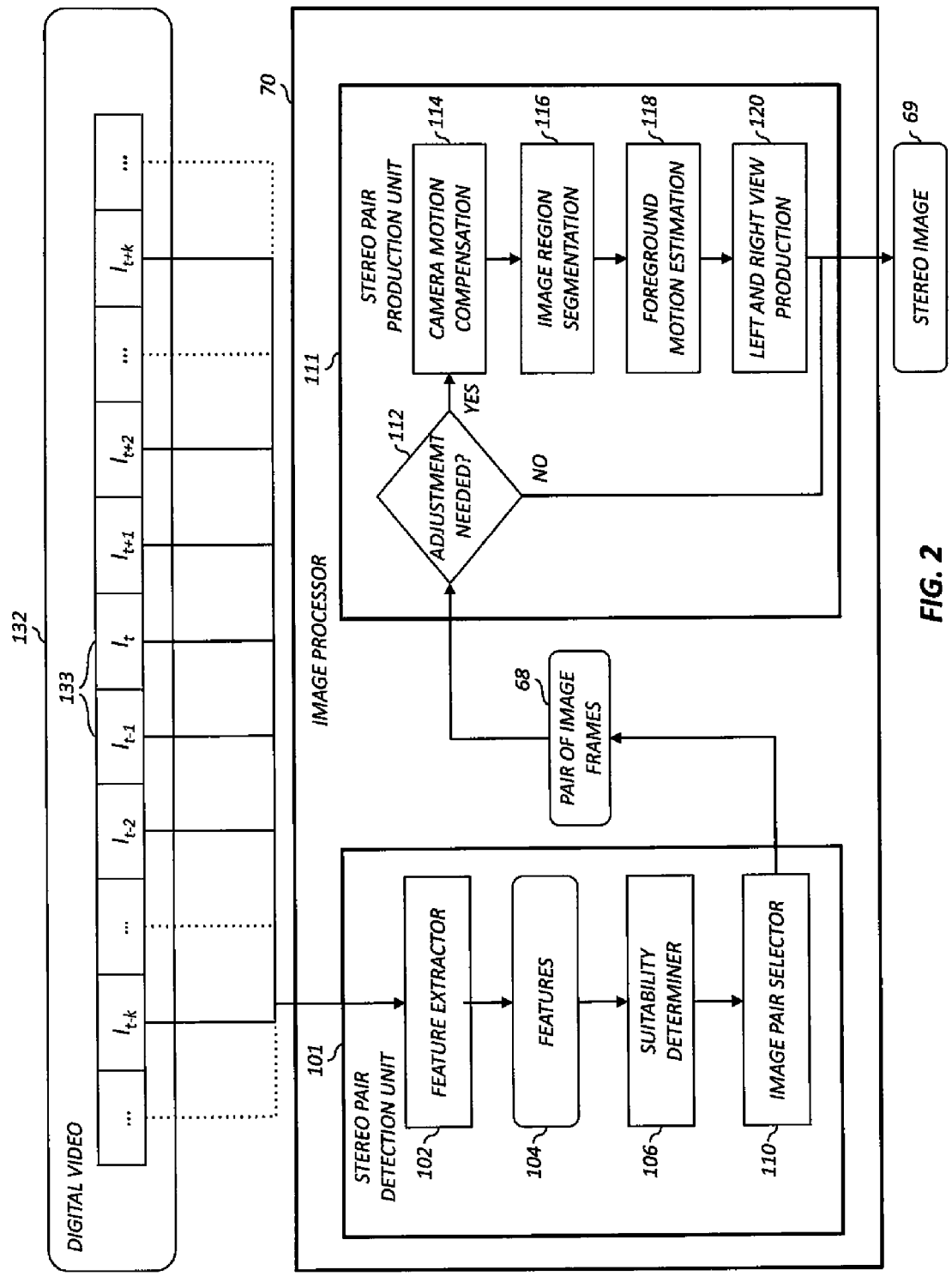
FIG. 2 is a block diagram illustrating the method of the present invention for producing a stereo image from a digital video.

FIG. 2 illustrates the method of the invention in more detail according to a preferred embodiment. The image processor 70 includes the stereo pair detection unit 101 and the stereo pair production unit 111. The stereo pair detection unit 101 receives the digital video 132 including a temporal sequence of image frames 133 and, after processing, determines a suitable pair of image frames 68. The stereo pair production unit 111 then produces the stereo image 69. Broadly speaking, the stereo pair detection unit 101 is directed at identifying a pair of image frames 68 from the digital video 132 that are suitable for producing the stereo image 69 by determining suitability scores and quality scores for candidate image pairs from the digital video 132. Then the stereo pair production unit 111 produces the stereo image 69 from the identified pair of image frames 68.

Now, in more detail, the digital video 132 is input to a feature extractor 102 for extracting a set of features 104 from each candidate pair of image frames. Many different types of features 104 can be computed for the image frames 133. In a preferred embodiment, the features 104 includes a set of motion vectors determined for a corresponding points in the candidate pair of image frames, together with various metrics computed from the set of motion vectors. In alternate embodiments, the features 104 can also include other types of features, such as color histogram features.

For the following discussion, it will be assumed that the digital video 132 contains N images. The features 104 for a pair of image frames 133 ($I_t$ and $I_{t+k}$), corresponding to times t and t+k, respectively, can be represented as a feature vector F(t,t+k). The parameter k is a frame offset (e.g., k=6 means that second image frame is 6 frames later than the first image frame, which is about 0.2 seconds later at a typical capture rate of 30 frames/second). Note that k can be a negative frame offset. In a preferred embodiment, the feature vector F(t,t+k) includes a set of motion vectors that are found by tracking the locations of corresponding points between the two image frames $I_t$ and $I_{t+k}$ from the digital video 132. In a preferred embodiment, the set of candidate pairs of image frames that are evaluated using the feature extractor 102 include all pairs of image frames ($I_t$ and $I_{t+k}$) where t ranges from 0 to N and k ranges from −K to +K, where K is a predefined constant (e.g., K=6).

To compute the set of motion vectors, the well known KLT (Kanade-LucasTomasi) feature tracking algorithm described in the article by Shi et al., entitled "Good features to track" (Proc. IEEE Conference on Computer Vision and Pattern Recognition, pp. 593-600, 1994) can be used to detect interest points called KLT features in the first image frame. Next, the interest points are tracked across the two image frames to establish a correspondence between interest point locations in the two image frames. This tracking process is also described in the article by Lucas et al. entitled "An iterative image registration technique with an application to stereo vision" (Proc. Imaging Understanding Workshop, pp. 121-130, 1981).).

In some embodiments, the set of motion vectors can be further processed to remove extraneous motion vectors. This can be done by enforcing geometric consistency between the corresponding points, as, for example, is described by Sivic et al. in the article "Video Google: a text retrieval approach to object matching in videos" (Proc. IEEE International Conference on Computer Vision: pp. 1470-1477, 2003).

Figure 3:
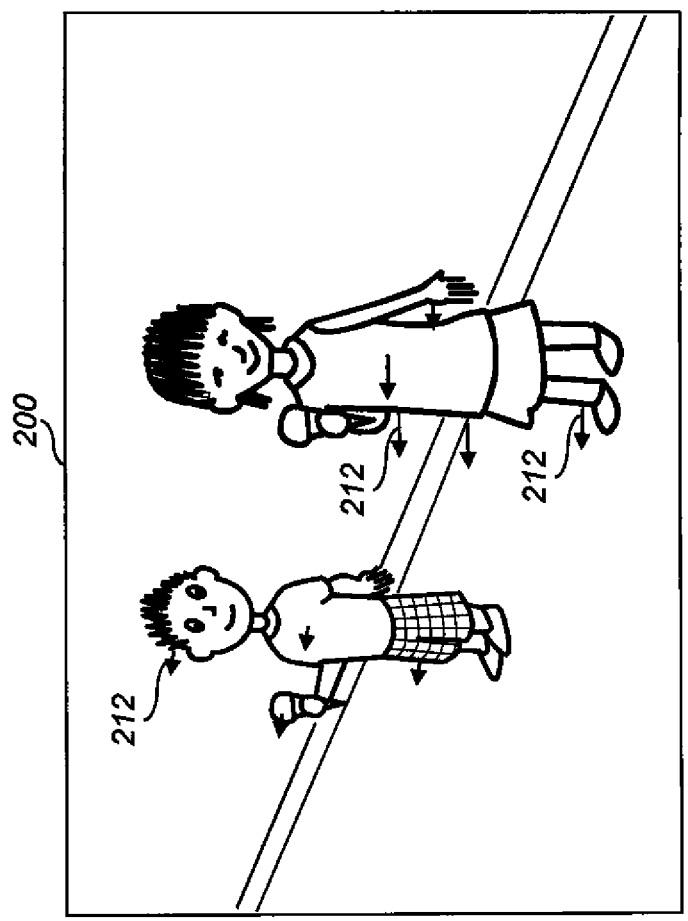
FIG. 3 is an illustration of an image frame together with corresponding motion vectors.

FIG. 3 shows an example of an image frame 200, together with a set of motion vectors 212 pointing from KLT points identified in the image frame 200 (at a time t) to the locations of corresponding tracked points in the image frame at time t+k (not shown). The collection of motion vectors 212 is included in the features 104 for the image frame and describes both the motion of objects in the scene, and the motion of the camera.

In other embodiments, different methods can be used to determine the motion vectors. For example, the well-known SIFT (scale invariant feature transform) feature point matching method described in U.S. Pat. No. 6,711,293 to Lowe, "Method and apparatus for identifying scale invariant features in an image and use of same for locating an object in an image," can be used to determine the set of motion vectors.

The set of features 104 can also include additional features related to the camera motion between the image frames at times t and t+k in the digital video 132. In a preferred embodiment, the well-known RANSAC-based epipolar geometry estimation algorithm can be used to quantify camera motion. A description of this algorithm can be found in chapters 9-11 in the book "Multiple view geometry in computer vision," by Hartley, et al. (Cambridge University Press, Second Edition, 2004).

Other methods for quantifying camera motion can also be used in accordance with the present invention. One computationally efficient approach for quantifying camera motion is computed by assuming a translational motion model and computing the horizontal and vertical translational motion between each pair of consecutive image frames. This can be performed by using an integral projection matching algorithm, as described in the article "Real-Time Digital Video Stabilization for Multi-Media Applications," by Ratakonda, (Proc. IEEE International Conference on Computer and Systems, Vol. 4, pp. 69-72, 1998).

Figure 6:
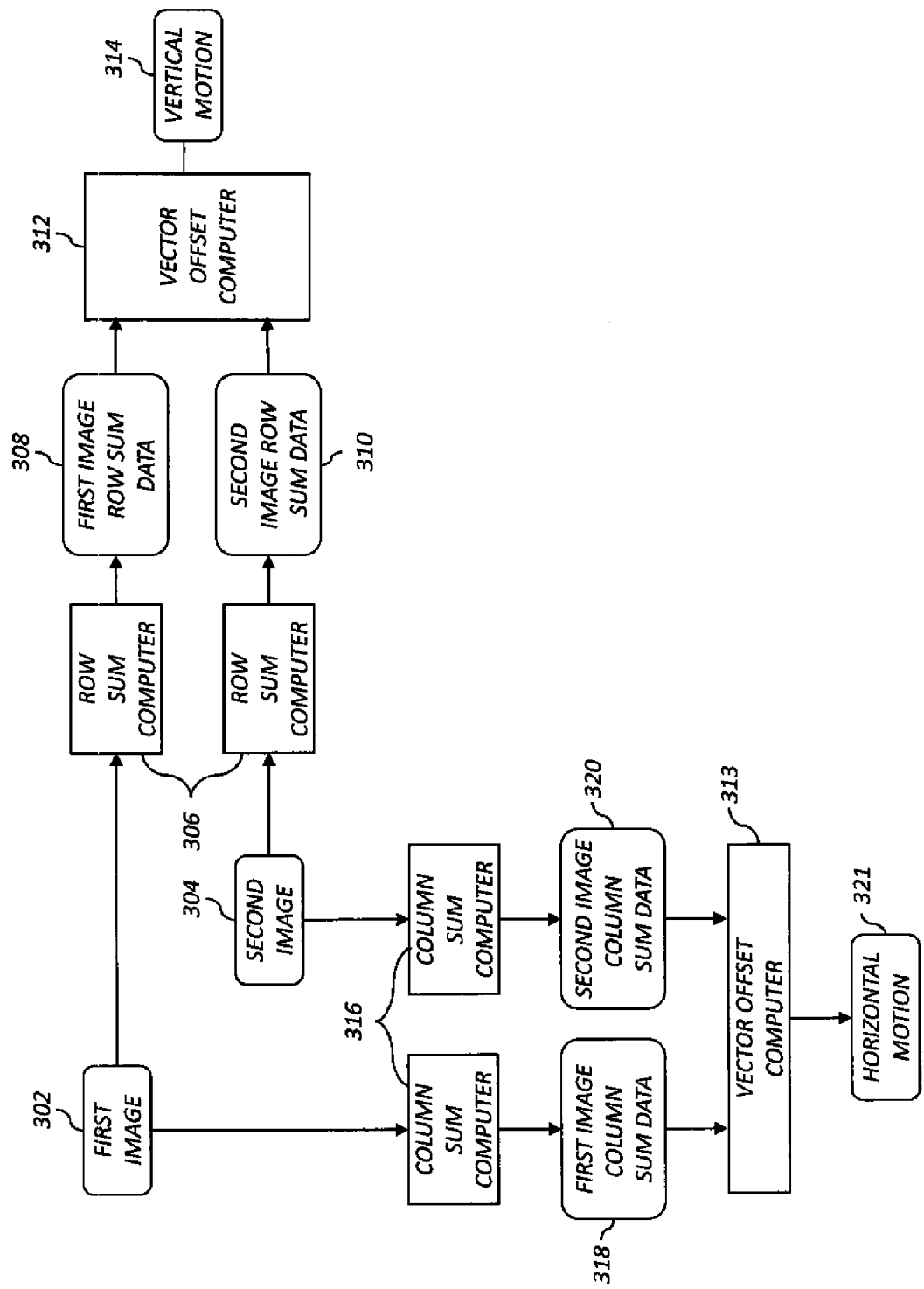
FIG. 6 illustrates a method for estimating features for a pair of image frames in a digital video related to vertical and horizontal motion.

This process is illustrated in FIG. 6. A first image 302 and a second image 304, which correspond to two image frames of the digital video 132 (FIG. 2), are the inputs for the integral projection matching algorithm. The first image 302 is input to a row sum computer 306 which computes a vector of first image row sum data 308, that is to say for each row of the first image 302, it computes the sum of all pixel data values in that row. Similarly, the second image 304 is input to a row sum computer 306 which computes a vector of second image row sum data 310. The first image row sum data 308 and second image row sum data 310 are input to a vector offset computer 312, which computes the offset that best matches the two input vectors. Those skilled in the art will recognize that there are many methods by which to find the best matching offset between two vectors, including maximizing cross correlation or minimizing the sum of squared errors. In a preferred embodiment, the best offset is determined by minimizing the sum of absolute errors. The determined best offset represents a vertical motion 314 between the first image 302 and second image 304.

Similar steps are used to determine the horizontal motion between the first image 302 and the second image 304. Specifically, the first image 302 is input to a column sum computer 316 which computes a vector of first image column sum data 318, that is to say for each column of the first image 302, it computes the sum of all pixel data values in that column. Similarly, the second image 304 is input to the column sum computer 316 which computes a vector of second image column sum data 320. The first image column sum data 318 and second image column sum data 320 are input to a vector offset computer 313, which computes the offset that best matches the two input vectors. The determined best offset represents a horizontal motion 321 between the first image 302 and second image 304.

In other embodiments, the features 104 can include features representing detected objects in the image frames from the digital video 132, such as faces, grass, trees, sky, people and water. Detecting objects in images is a well known problem for which many solutions have been described, such as that disclosed by Shotton et al., in the article "TextonBoost: joint appearance, shape and context modeling for multi-class object recognition and segmentation" (Proc. European Conference on Computer Vision, pp. 1-15, 2006).

In a preferred embodiment, the feature extractor 102 computes the following set of features 104, for use by the suitability determiner 106:

1. Motion vectors between corresponding points in the pair of image frames.
2. Average flow over all tracked points.
3. Ratio of the average horizontal flow divided by the average vertical flow.
4. Average angle of epipolar lines.
5. Variance of angle of epipolar lines.
6. Average flow of epipolar inliers.
7. Standard deviation of epipolar inliers' flows.
8. Ratio of average horizontal flows over average vertical flows of epipolar inliers.
9. Ratio of standard deviation of horizontal flows over standard deviation of vertical flows of epipolar inliers.
10. Average flows of epipolar outliers.
11. Standard deviation of epipolar outliers' flow vectors.
12. Boolean value indicating whether the epipole is inside image.
13. Eigenvalues of 2D scatter matrix with respect to epipolar inliers' flow vectors.

14. Ratio of the largest eigenvalue over the smallest eigenvalue for 2D scatter matrix with respect to epipolar inliers' flow vectors.
15. Eigenvectors of the 2D scatter matrix with respect to epipolar inliers' flow vectors.
16. Eigen values of the 2D scatter matrix with respect to epipolar inliers.
17. Eigenvectors of the 2D scatter matrix with respect to epipolar inliers.
18. Locations of epipoles 1 and 2.
19. Angle of line connecting centers of image and epipoles.
20. Ratio of the number of epipolar inliers divided by the total number of motion vectors.
21. Estimates of the camera motion (i.e. relative camera positions) between the two images ($I_t$ and $I_{t+k}$). This can be estimated using standard structure from motion approaches.
22. Estimates of the 3D points and their mean and variances.

Features #2 and #3 can be calculated from the motion vectors using simple statistical calculations. Features #4-#20 can be calculated from the motion vectors by determining the well-known epipolar geometry characteristics using the RANSAC-based epipolar geometry estimation algorithm (as described in chapters 9-11 of the aforementioned book by Hartley, et al.), and then applying standard statistical calculations. Features #22 and #23 can be calculated using well-known structure from motion algorithms (e.g., see the article by Snavely et al., entitled "Photo tourism: exploring photo collections in 3D," ACM Transactions on Graphics, pp. 835-846, 2006). Motion vectors capture the change in the relative position of corresponding feature points between the images in a pair of image frames 68. Because the stereo suitability score relies on motion vectors for its computation, it is determined responsive to the relative positions of corresponding features in a pair of digital images.

Returning now to a discussion of FIG. 2, a suitability determiner 106 is used to analyze the features 104 to produce a suitability score for each candidate pair of image frames from the digital video 132. The suitability score provides an indication of the suitability of the pair of image frames for producing the stereo image 69. In a preferred embodiment, the suitability determiner 106 uses a classifier from the field of machine learning, and can incorporate any known classification or regression algorithm. The classifier used by the suitability determiner 106 can be trained using standard methods of machine learning with examples of pairs of image frames that are judged to be suitable for producing the left and right views of stereo images (positive examples) and examples of pairs of image frames that are judged to be not suitable for producing stereo images (negative examples). For example, pairs of image frames that would not be suitable for producing the stereo image 69 would correspond to cases where the camera only rotates about its center, or where the camera only zooms in and out. On the other hand, examples of conditions that would produce pairs of image frames that would be suitable for producing the stereo image 69 would include cases where: (1) the objects in the scene are static and the camera is moving laterally and smoothly parallel to the ground; (2) the objects in the scene move approximately constant speed in the same horizontal directions and speed while the camera is static; and (3) the objects in the scene move different speed and different direction while the camera is non-static, or static.

Figure 4B:
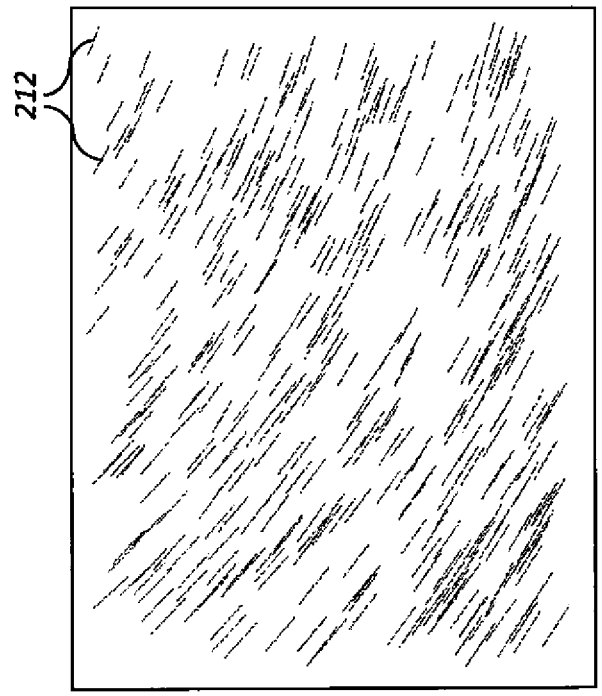
FIG. 4B illustrates a set motion vectors for a pair of image frames that are unsuitable for producing a stereo image.
Figure 4A:
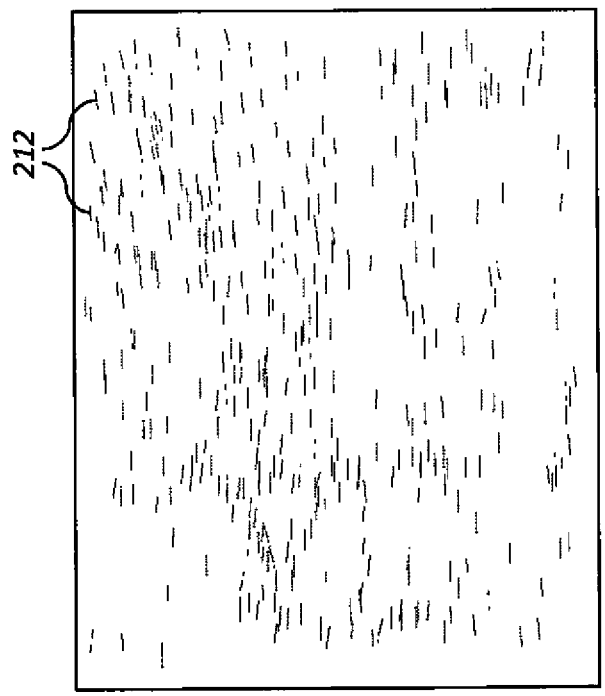
FIG. 4A illustrates a set motion vectors for a pair of image frames that are suitable for producing a stereo image.

For example, FIG. 4A shows a visualization of motion vectors 212 (which are included in the features 104) for an example pair of image frames 133. The motion vectors 212 point from feature locations in the first image frame to corresponding feature locations in the second frame. The motion vectors 212 of FIG. 4A represent an example of motion characteristics that would be suitable for producing the stereo image 69, because the motion vectors are in a predominantly horizontal direction, and because there is a desirable distribution of motion vector magnitudes. FIG. 4B shows a visualization of motion vectors 212 for a second example pair of image frames 133. In this case, the motion vectors 212 represent an example of motion that would be unsuitable for producing the stereo image 69 because the motion vectors are in a predominantly diagonal direction with a narrow distribution of motion vector magnitudes.

The suitability determiner 106 (FIG. 2) is used to analyze the features 104 for each candidate pair of image frames 133, including the distributions of motion vectors 212, to determine quantitative suitability scores. The suitability scores between the $I_t$ and $I_{t+k}$ can be represented as $S(t,t+k)$. In a preferred embodiment, the suitability scores are calculated such that they range numerically from −1.0 (highly unsuitable) to +1.0 (highly suitable). The suitability determiner 106 can be configured either with manual parameter tuning, or by using machine-learning techniques. In the preferred embodiment of invention, a support vector machine classifier is trained with the training set of images containing the positive samples and the negative samples. Once trained, the classifier can be used to determine a suitability score for a candidate pair of image frames 133 as a function of the corresponding features 104. Support vector machine classifiers are well-known in the machine learning art. It will be obvious to one skilled in the art that other forms of classifiers can also be used in accordance with the present invention.

In some embodiments, the suitability score can represent an estimate of the stereo quality that would result if the candidate pair of image frames 133 were used to produce the stereo image 69. In this case, the classifier can be trained using stereo quality values determined for the training set containing the positive samples and the negative samples.

In other embodiments, the classifier can be trained by assigning the positive samples suitability scores of +1 and the negative samples suitability scores of −1. In this case, it will generally be desirable to use a second state quality determiner to evaluate candidate image pairs that the suitability determiner 106 determines to have a suitability score higher than a specified threshold value.

Mathematically, to train a classifier that can determine the stereo quality for a candidate pair of image frames 133 as a response, stereo quality values need to be determined for the training set. In some embodiments, the stereo quality values for the training set can be determined by evaluating the image pairs using human observers. In other embodiments, the stereo quality can be estimated using various objective metrics. One measure of stereo quality is related to the range of depths corresponding to the range of motion vectors between the pair of image frames 133. A small range of depths would correspond to a low stereo quality since it would appear to be flat and would not enable significant 3D perception. In one embodiment a standard deviation of the epipolar Milers' horizontal flows can be used as a quantitative estimate of the stereo quality. However, it will be obvious to one skilled in the art that any appropriate measure of stereo quality can be used to evaluate the training set that is used to train the classifier.

The suitability scores are received by an image pair selector 110 for selecting at least one pair of image frames 68 from the candidate pairs of image frames evaluated in the digital video 132, where the selected pair of image frames 68 will be used to produce the stereo image 69. Preferably, the image pair selector 110 selects the candidate pair of image frames having the highest suitability score. In some situations, no candidate pairs of image frames in the digital video 132 will have a suitability score higher than a predefined threshold, indicating that no pair of image frames 68 can be selected that would be suitable for producing the stereo image 69.

In some embodiments, the image pair selector 110 can consider the suitability score together with other scores (e.g., an image appeal scores such as that described in U.S. Pat. No. 6,847,733, a score indicating whether an image frame is appropriate for selection as a key frame as described in U.S. Pat. No. 7,778,469, a score indicating the likelihood of faces being present in the image frame as described in U.S. Pat. No. 6,847,733, or other appropriate scores.) In some embodiments, one or more score can be based on manual input from a human viewer indicating a particular image frame or a range of image frames in the digital video 132 that are of interest.

After pair of image frames 68 has been selected, the stereo pair production unit 111 produces the stereo image 69 by processing the pair of image frames 68 to determine left and right views for the stereo image 69. Preferably, the stereo pair production unit 111 applies a series of operations to the pair of image frames 68 such that the stereo image 69 has the appearance of a static scene that has been captured with a camera that has undergone a simple horizontal translation.

For the case where a video of a static scene is captured with a camera that is undergoing horizontal translation, the selected pair of image frames 68 will make a good quality stereo image 69 without any further processing. Similarly, for the case where the camera is static and the scene is moving horizontally, the selected pair of image frames 68 can also be used to make a good quality stereo image 69 without any further processing. Mathematically, these two situations can be considered to be identical by considering the camera position relative to the scene.

For the cases where multiple foreground objects are moving in arbitrary directions, or where the moving object is not rigid, the objects (or part of objects) have conflicting epipolar geometries. For example, consider the case where two rigid objects are moving toward each other from the left and right directions. The motion of one object defines an epipolar geometry in which $I_t$ would be appropriate for use in the right view of the stereo image 69 and $I_{t+k}$ would be appropriate for use in the left view of the stereo image 69. Conversely, the motion of the other object defines an epipolar geometry in which $I_t$ would be appropriate for use in the left view of the stereo image 69 and $I_{t+k}$ would be appropriate for use in the right view of the stereo image 69. Therefore, additional processing must be applied to correct for these inconsistencies within the selected pair of image frames 68 in order to produce an acceptable stereo image 69.

An adjustment needed test 112 is used to evaluate the motion characteristics for the pair of image frames 68 to determine whether additional processing is required to produce the left and right views for the stereo image 69. In a preferred embodiment, the method of estimating the number of independent motions described in the article by Vidal et al., entitled "Two-View Multibody Structure from Motion" (International Journal of Computer Vision, Vol. 68, pp. 7-25, 2006), can be used for the adjustment needed test 112.

If the number of independent motions is determined to be one, no adjustment is needed. In this case, the pair of image frames 68 can be used directly for the left and right views of the stereo image 69. A structure from motion algorithm such as that described by Snavely et al. in the aforementioned article entitled "Photo tourism: exploring photo collections in 3D," can be used to determine which of the two images should be the left view, and which should be the right view. This can be done by determining the camera positions from motion vectors 212 using the structure from motion algorithm, and then determining which image corresponds to the left-most camera position when facing the same direction as the camera. This image would be used for the left view, and the other image would be used for the right view.

If the number of independent motions is determined to be larger than one, a series of different processing operations are applied to the pair of image frames 68 to form the left and right views of the stereo image 69. In a preferred embodiment, these processing steps have the effect of constructing an image for the left view of the stereo image 69 by compositing, from both of the images, all of the object parts when they are in their rightmost positions. Likewise, an image for the right view of the stereo image 69 is constructed by compositing all of the object parts when they are in their left most positions. The left view and rights are constructed in accordance with a motion consistency map that indicates regions of consistent motion (e.g. similar direction or magnitude) between the pair of image frames 68.

To produce the left and right views correctly, it is necessary to solve the challenging problem of detecting image regions that move to the right or left. Any method known in the art for characterizing object motion can be used in accordance with the present invention. For the present purposes, it is only necessary to determine the direction of the horizontal component of the foreground object motion. This can greatly simplify the complexity of the object motion determination.

In a preferred embodiment, the following steps are used to characterize the foreground object motion and form the left and right views of the stereo image 69. A camera motion compensation step 114 performs a 2D image stabilization between the pair of image frames 68 ($I_t$ and $I_{t+k}$) to compensate for background motion. This is preferably accomplished by applying vertical and horizontal shifts to one of the image frames in the pair of image frames 68 to align the image backgrounds. In some embodiments, a magnification factor is also applied to magnify one of the image frames in the pair of image frames 68 to match the size of the backgrounds in the two image frames. The vertical and horizontal shifts and the magnification factor can be determined using any method known in the art. In a preferred embodiment, these values can be determined using the well-known RANSAC-based homography estimation method described in chapter 4 of the aforementioned book by Hartley et al.

Next, an image region segmentation step 116 computes an image region segmentation $S_i$ of one of the image frames $I_t$, where the subscript "i" denotes an image region number. This enable the motion estimation process to avoid problems associated with estimating optical flow at object boundaries. Any method for segmenting digital images into image regions known in the art can be used in accordance with the present invention. In a preferred embodiment, the method described by Felzenszwalb et al. in the article entitled, "Efficient graph-based image segmentation" (International Journal of Computer Vision, Vol. 59, pp. 167-181 2004) is used to perform an image region segmentation. This method determines the image region segmentation by identifying groups of image pixels to be associated with a particular image region based on color similarity and distance.

Next, a foreground motion estimation step 118 is used to determine a motion vector for each of the image regions determined by the image region segmentation step 116. In a preferred embodiment, it is only necessary to determine a horizontal motion direction rather than a full motion vector. In some embodiments, this can be done by determining correlation values between a particular image region in the first image frame and corresponding image regions in the other image frame as a function of horizontal spatial offset. The horizontal spatial offset producing the highest correlation can provide an indication of whether the image region moved to the left of the right between the pair of image frames 68.

In a preferred embodiment, the horizontal motion direction for each image region is determined by formulating the problem as a Markov Random Field problem in order to enforce consistency between similar neighboring image regions. With this approach a Markov Random Field (MRF), G, is defined with each node $v_i$ corresponding to an image region $S_i$ of the image frame $I_t$. The binary hidden variable space for the MRF is defined to be $v_i=1$ for "moving to the left or stationary" and $v_i=0$ for "moving to the right." Edges for the MRF are defined over neighboring image regions i and j. (Defining the nodes of G to be image region $S_i$ has benefit of faster estimation of foreground motion. In alternate embodiments, each pixel in the image frame can be used as the nodes of G. In such cases, it is possible to omit the image region segmentation step 116.)

Any optimization algorithm known in the art for solving an MRF can be used in accordance with the present invention. In a preferred embodiment, the foreground motion estimation step 118 uses the FastPD algorithm described by Komodakis et al. in the article entitled "Approximate labeling via graph cuts based on linear programming" (IEEE Transactions on Pattern Analysis and Machine Intelligence, Vol. 29, pp. 1436-1453, 2007) to solve the MRF. This method involves minimizing the energy E of the MRF given by Eq. (3):

$$E = \sum_i f_i(v_i) + \sum_{ij} f_{ij}(v_i, v_j) \qquad (3)$$

where the unary data term $f_i(v_i)$ is given as:

$$f_i(v_i) = \begin{cases} \min_{\hat{x} \leq 0, \hat{y}} \dfrac{\sum_{(x,y) \in S_i} (I_t(x,y) - I_{t+k}(x+\hat{x}, y+\hat{y}))^2}{\sum_{(x,y) \in S_i} 1}; & v_i = 1 \\ \min_{\hat{x} > 0, \hat{y}} \dfrac{\sum_{(x,y) \in S_i} (I_t(x,y) - I_{t+k}(x+\hat{x}, y+\hat{y}))^2}{\sum_{(x,y) \in S_i} 1}; & v_i = 0 \end{cases} \qquad (4)$$

and the binary data term $f_{ij}(v_i, v_j)$ is given as:

$$f_{ij}(v_i, v_j) = \alpha \frac{|v_i - v_j|}{D(S_i, S_j)} \qquad (5)$$

where $\hat{x}$ and $\hat{y}$ are spatial offsets, $\alpha$ is constant, $D(S_i, S_j)$ is a measure of the similarity between the image regions $S_i$ and $S_j$. In a preferred embodiment, $\alpha=10000$ and the spatial shifts are evaluated over the range $-30 \leq \hat{x}, \hat{y} \leq 30$.

The value of $f_i(v_i)$ when $v_i=1$ in Eq. (4) is the minimum of the average of the squared RGB pixel differences between the pixel values for the image region $S_i$ in the first image frame ($I_t$), and the corresponding pixel values in the second image frame ($I_{t+k}$), when $S_i$ is translated in a negative x direction. Similarly, value of $f_i(v_i)$ when $v_i=0$ is the minimum of the average of the squared RGB pixel differences between the pixel values for the image region $S_i$ in the first image frame ($I_t$), and the corresponding pixel values in the second image frame ($I_{t+k}$), when $S_i$ is translated in a positive x direction. The value of $f_{ij}(v_i, v_j)$ in Eq. (5) penalizes a label difference between the image regions $S_i$ and $S_j$ by a larger amount as $S_i$ and $S_j$ become more similar.

In a preferred embodiment the $D(S_i, S_j)$ is a Euclidean distance between the mean RGB values for the two image regions $S_i$ and $S_j$. However, in other embodiments, more complex measurements of image similarity can be used, such as the well-known "earth mover's distance" between color histograms (e.g., RGB histograms) for the two image regions $S_i$ and $S_j$.

The resulting values for $v_i$ determined by solving the MRF are used to populate a motion consistency map M having an array of pixels that indicates regions of consistent motion between the pair of image frames 68, with a first pixel value (e.g., "1") indicating image regions (or object parts) that moved to the left (or were stationary), and a second pixel value (e.g., "0") indicating image regions (or object parts) that moved to the right. The motion consistency map M is the output of the foreground motion estimation step 118.

A left and right view production step 120 is used to determine the left and right views for the stereo image 69 responsive to the determined motion consistency map M. In a preferred embodiment, the motion consistency map M is blurred using a Guassian filter having a 7×7 kernel size to produce a blending map $M_b$. The blending map $M_b$ is used to produce the left and right view images by blending the pair of image frames 68 ($I_t$ and $I_{t+k}$). The left view $I_L$ for the stereo image 69 is produced as:

$$I_L(x,y)=I_t(x,y)M_b(x,y)+I_{t+k}(x,y)(1-M_b(x,y)) \qquad (6)$$

It can be seen that the blending map $M_b$ serves to define weighting values that provide an indication of the relative fraction of the first and second images that should be combined to produce the left view image. Similarly, the right view $I_R$ for the stereo image 69 is produced as:

$$I_R(x,y)=I_t(x,y)(1-M_b(x,y))+I_{t+k}(x,y)M_b(x,y) \qquad (7)$$

It can be seen that Eq. (8) combines the first and second images using weighting values that are complementary to those in Eq. (6).

Figure 5:
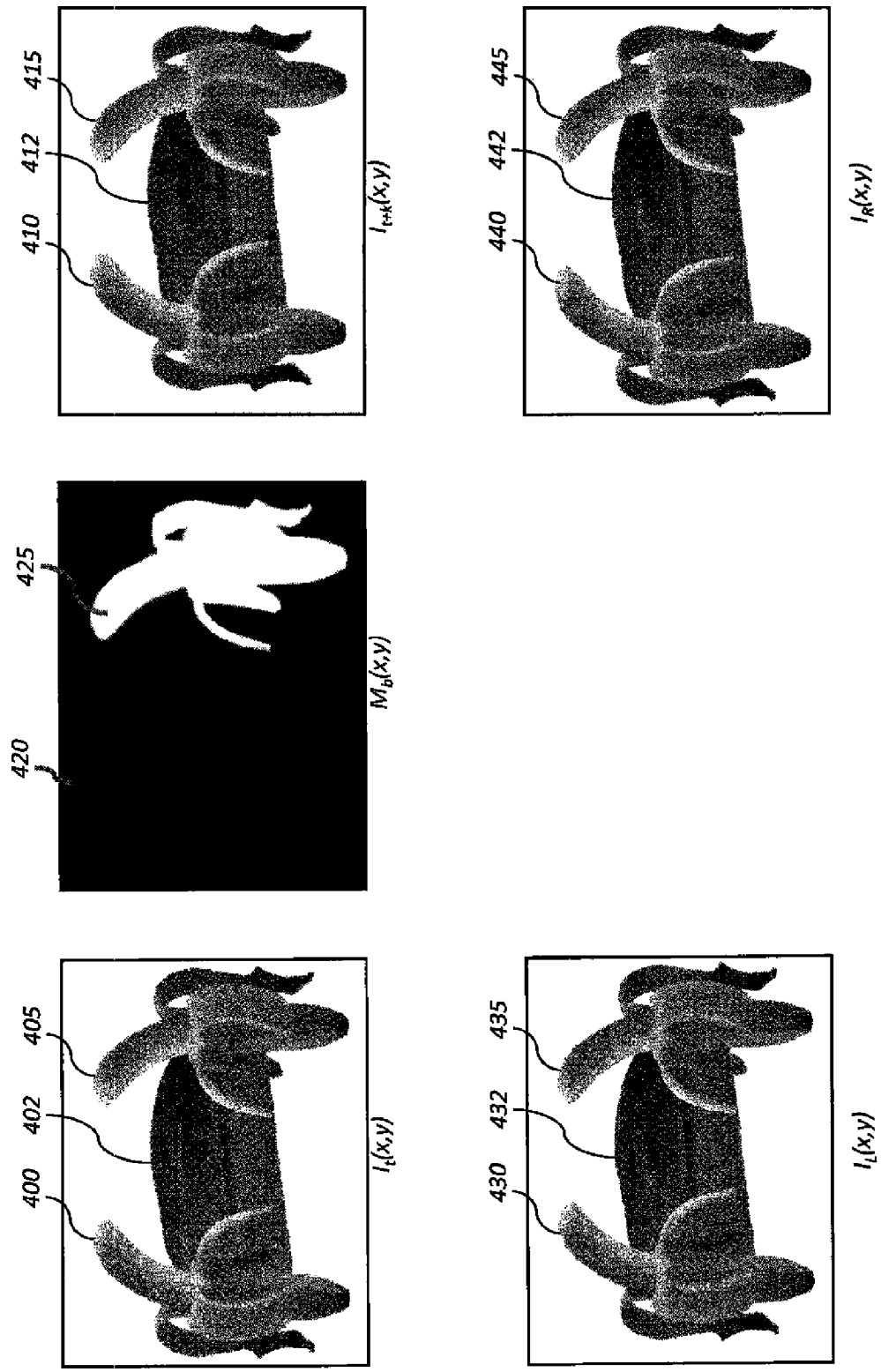
FIG. 5 shows a set of images illustrating the formation of left and right views for a stereo image according to a preferred embodiment.

This procedure associated with the left and right view production step 120 is illustrated by the example in FIG. 5, which shows a pair of image frames $I_t(x,y)$ and $I_{t+k}(x,y)$ where the two bananas are moving in opposite directions towards the middle of the image, together with a blending map $M_b(x,y)$ determined using the method described above. A first banana moves from an initial banana position 400 in the first image frame to the right to a final banana position 410 in the second image frame. Similarly, a second banana moves from an initial banana position 405 in the first image frame to the left to a final banana position 415 in the second image frame. A loaf starts in an initial loaf position 402 in the first image frame and remains in the same final loaf location 412 in the second image frame. If the pair of image frames $I_t(x,y)$ and $I_{t+k}(x,y)$ were used directly to make a stereo image 69, the 3D effect would be inconsistent because of the different directions of motion for the two bananas. (One would appear to be at a depth behind the loaf, even though it is obviously in front of the loaf.) This would produce an uncomfortable viewing effect for the observer.

It can be seen that the blending map $M_b(x,y)$ is white in a white region 425 where the object positions in the second image frame are to the left of the corresponding object positions in the first image frame, and the blending map $M_b(x,y)$ is black in a black region 420 where the object positions have moved to the right or stayed in the same position. The boundaries between the black and white regions of the blending map $M_b(x,y)$ have been blurred to provide a smooth transition.

The left view $I_L(x,y)$ was determined using Eq. (6), and the right view $I_R(x,y)$ was determined using Eq. (7). It can be seen that the positions of the bananas in the right view (i.e., right view banana positions 440 and 445) are to the left of the corresponding positions of the bananas in the left view (i.e., left view banana positions 430 and 435), whereas right view loaf position 442 is approximately the same as left view loaf position 432. When the left and right views of the stereo image 69 are presented in a viewable form the resulting image will produce a proper 3D impression (i.e., the two bananas will appear to be in front of the loaf as would be expected).

In the preferred embodiment, the stereo image 69 contains two images (the produced left view $I_L$ and right view $I_R$) determined from the pair of image frames 68 ($I_t$ and $I_{t+k}$). In other embodiment, the stereo image 69 can contain more than two views. To determine images for the additional views, computer graphic techniques can be used to produce a rendering of what that scene would look like from another point of view. This can be done by determining and estimated 3D geometry for the scene based and the left and right views ($I_L$ and $I_R$). The 3D geometry can be determined using various well-known methods such as that described by Hoiem et al. in the article "Automatic Photo Pop-up," (ACM Transactions on Graphics, Vol. 24, pp. 577-584, 2005), or that described by Mičušik et al. in the article "Multi-view superpixel stereo in urban environments" (International Journal of Computer Vision, Vol. 89, pp. 106-119, 2010).

The stereo image 69 can be viewed using any stereo image viewing method known in the art. Stereo images 69 often must be configured in a specific way depending on the characteristics of the display 90 and the viewing method. For example, when the display 90 is a standard (2D) LCD softcopy display, the left and right views ($I_L$ and $I_R$) of the stereo image 69 can be combined to produce an anaglyph image using well-known techniques. The anaglyph image can then be viewed by an observer wearing special anaglyph glasses with red and blue filters over the two eyes. The anaglyph image can also be printed on a hardcopy printer for viewing by the observer wearing the anaglyph glasses. In other cases, the display 90 can be adapted to display the left and right views ($I_L$ and $I_R$) in an alternating sequence so that they can be viewed by an observer wearing shutter glasses. The shutter glasses are synchronized with the display 90 such that when the display 90 is displaying the left view image the shutter glasses block light to an observer's right eye, and when the display 90 is displaying the right view image the shutter glasses block light to the observer's left eye. Other types of viewing methods that could be used would include well-known techniques including lenticular stereoscopic displays, barrier stereoscopic displays or polarizing stereoscopic displays.

In some embodiments, the image pair selector 110 can identify multiple pairs of image frames 68. In this case, the stereo pair production unit 111 will produce a stereo image 69 from each of the pairs of image frames 68.

Figure 7:
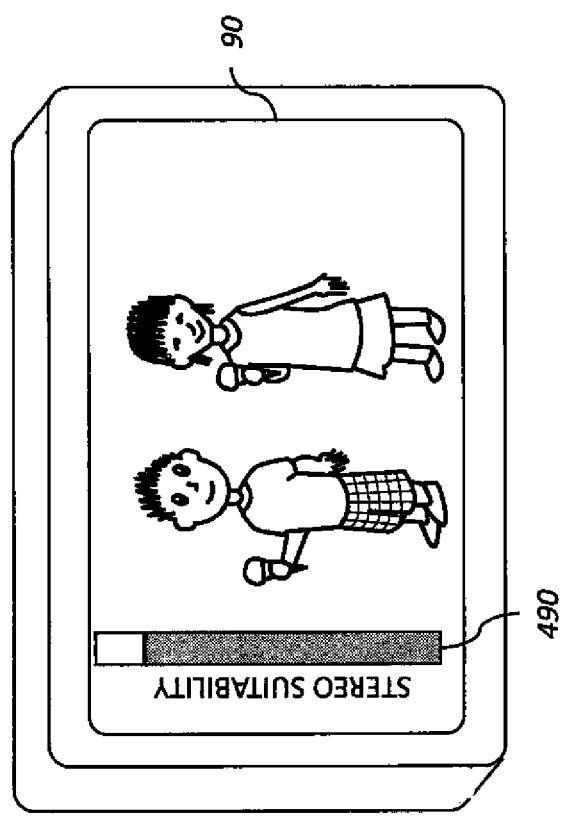
FIG. 7 illustrates a digital imaging system including a stereo suitability indicator.

In a further embodiment, a digital imaging system 20 (FIG. 1) can be adapted to instruct a human operator on how to capture the digital video 132 in anticipation of producing the stereo image 69. For example, during video capture, it is common for images from the digital video 132 to be displayed on the display 90. Simultaneously, the image processor 70 can analyze the digital video 132 with the method described in FIG. 2, to determine a suitability score for each image of the video (or in some embodiments, every $R^{th}$ image). Then, a stereo suitability indicator 490 is displayed on the display 90 as shown in FIG. 7. This permits the user to adjust his or her videography style dynamically to capture a digital video 132 that is better suited to produce improved stereo images 69.

The invention has been described in detail with particular reference to certain preferred embodiments thereof, but it will be understood that variations and modifications can be effected within the spirit and scope of the invention.

PARTS LIST 12 digital processor
20 digital imaging system
30 image capture subsystem
43 compass
45 tilt sensor
47 accelerometer
49 light source
60 user controls
62 user preferences
68 pair of image frames
69 stereo image
70 image processor
90 display
101 stereo pair detection unit
102 feature extractor
104 features
106 suitability determiner
110 image pair selector
111 stereo pair production unit
112 adjustment needed test
114 camera motion compensation step
116 image region segmentation step
118 foreground motion estimation step
120 left and right view production step
130 image sensor
132 digital video
133 image frame
134 lens
200 image frame
212 motion vector
302 first image
304 second image
306 row sum computer
308 row sum data
310 row sum data
312 vector offset computer
313 vector offset computer
314 vertical motion
316 column sum computer
318 column sum data
320 column sum data
321 horizontal motion
322 RAM buffer memory
323 storage memory
324 real-time clock
328 firmware memory
329 GPS unit
340 audio codec
341 general purpose computer
342 microphone
344 speaker
350 wireless modem
358 mobile phone network
370 internet
375 image player
400 initial banana position
402 initial loaf position 405 initial banana position
410 final banana position
412 final loaf position
415 final banana position
420 black region
425 white region
430 left view banana position
432 left view loaf position
435 left view banana position
440 right view banana position
442 right view loaf position
445 right view banana position
490 stereo suitability indicator

The invention claimed is:

1. A method of producing a stereo image from a temporal sequence of digital images, comprising:
receiving a temporal sequence of digital images captured by an image capture device;
using a processor to analyze pairs of digital images from the temporal sequence of digital images to produce corresponding stereo suitability scores, wherein the stereo suitability score for a particular pair of images is based on a set of motion vectors between corresponding points in the pair of digital images and epipolar geometry characteristics determined from the set of motion vectors, and wherein the suitability score is based on statistics of inliers and outliers of epipolar flow associated with the epipolar geometry characteristics;
selecting a pair of digital images including a first image and a second image based on the stereo suitability scores;
using a processor to analyze the selected pair of digital images to produce a motion consistency map indicating regions of consistent motion, the motion consistency map having an array of pixels;
using a processor to analyze the motion consistency map to determine whether the selected pair of digital images requires adjustment;
if the selected pair of digital images requires adjustment, producing a stereo image pair including a left view image and a right view image by combining the first image and the second image responsive to the motion consistency map; and
storing the stereo image pair in a processor-accessible memory.

2. The method of claim 1 wherein the motion consistency map is produced by:
identifying at least one rightward motion image region in the pair of digital images where the positions of a set of features in the image region in the first image are to the right of the positions of a corresponding set of features in the second image; and
assigning a first pixel value to pixels in the motion consistency map corresponding to the at least one rightward motion image region, and assigning a second pixel value to the remaining pixels in the motion consistency map.

3. The method of claim 1 wherein the motion consistency map is produced by:
identifying at least one leftward motion image region in the pair of digital images where the positions of a set of features in the image region in the first image are to the right of the positions of a corresponding set of features in the second image; and
assigning a first pixel value to pixels in the motion consistency map corresponding to the at least one leftward motion image region, and assigning a second pixel value to the remaining pixels in the motion consistency map.

4. The method of claim 1 wherein the motion consistency map is produced by:
identifying at least one rightward motion image region in the pair of digital images where the positions of a set of features in the image region in the first image are to the left of the positions of a corresponding set of features in the second image and assigning a first pixel value to pixels in the motion consistency map corresponding to the at least one rightward motion image region;
identifying at least one leftward motion image region in the pair of digital images where the positions of a set of features in the image region in the first image are to the right of the positions of a corresponding set of features in the second image and assigning a second pixel value to pixels in the motion consistency map corresponding to the at least one leftward motion image region; and
assigning either the first pixel value or the second pixel value to the remaining pixels in the motion consistency map.

5. The method of claim 1 wherein the motion consistency map is produced by first producing a binary motion consistency map, each pixel of the binary motion consistency map having either a first pixel value or a second pixel value, and then forming the motion consistency map by applying a smoothing operator to the binary motion consistency map to the blur a boundary between a first pixel value region and a second pixel value region to provide a smooth transition between the two regions.

6. The method of claim 1 wherein the motion consistency map specifies a weighting value for blending the first and second images, and wherein pixel values for the left view image and the right view image are produced by combining corresponding pixel values from the first and second images according to the corresponding weighting values in the motion consistency map.

7. The method of claim 6 wherein the weighting values provide an indication of the relative fraction of the first and second images that should be combined to produce the left view image, and wherein complementary fractions are used to combine the first and second images to produce the right view image.

8. The method of claim 1 wherein the temporal sequence of digital images is a digital video.

9. The method of claim 1 wherein the temporal sequence of digital images is a set of images captured in a burst capture mode.

10. The method of claim 1 wherein the process of analyzing a pair of digital images to produce a corresponding stereo suitability scores includes:
determining the suitability score training a support vector machine classifier responsive to the set of motion vectors and the epipolar geometry characteristics, wherein the support vector machine classifier is trained using a training set containing some pairs of digital images that are known to be suitable for producing stereo images and other pairs of digital images that are known to be unsuitable for producing stereo images.

11. The method of claim 10 wherein the set of motion vectors are determined by tracking a set of interest points between the pair of digital images.

12. The method of claim 11 wherein the set of interest points are tracked using a Kanade-Lucas-Tomasi feature tracking algorithm.

13. The method of claim 10 wherein the set of features further includes one or more features determined by applying statistical calculations to the set of motion vectors.

14. The method of claim 10 wherein the classifier is a support vector machine classifier.

15. The method of claim 1 further including displaying the stereo image pair using a stereo image display system.

16. The method of claim 15 wherein the stereo image display system is an anaglyph display system including a color image forming device, and wherein the left view images are combined to form an anaglyph image, which when displayed using the color image forming device is adapted to be viewed by an observer wearing anaglyph glasses having different color filters for the observer's left and right eyes.

17. The method of claim 16 wherein the color image forming device is a color softcopy display or a color hardcopy printer.

18. The method of claim 15 wherein the stereo image display system includes a lenticular stereoscopic display, a barrier stereoscopic display or a polarizing stereoscopic display.

19. The method of claim 15 wherein the stereo image display system includes:
- a softcopy display for displaying the left view image and the right view image in an alternating sequence;
- and shutter glasses synchronized with the softcopy display such that when the softcopy display is displaying the left view image the shutter glasses block light to an observer's right eye, and when the softcopy display is displaying the right view image the shutter glasses block light to the observer's left eye.

* * * * *